(12) United States Patent
Saji et al.

(10) Patent No.: US 10,300,536 B2
(45) Date of Patent: May 28, 2019

(54) CUTTING TOOL AND INDEXABLE ROTARY CUTTING TOOL

(71) Applicant: TUNGALOY CORPORATION, Fukushima (JP)

(72) Inventors: Ryuichi Saji, Iwaki (JP); Satoru Yoshida, Iwaki (JP); Yuki Oikawa, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 31 days.

(21) Appl. No.: 15/553,118

(22) PCT Filed: Mar. 4, 2016

(86) PCT No.: PCT/JP2016/056702
§ 371 (c)(1),
(2) Date: Aug. 23, 2017

(87) PCT Pub. No.: WO2016/140333
PCT Pub. Date: Sep. 9, 2016

(65) Prior Publication Data
US 2018/0036811 A1 Feb. 8, 2018

(30) Foreign Application Priority Data
Mar. 5, 2015 (JP) .................................. 2015-043189

(51) Int. Cl.
*B23C 5/20* (2006.01)
*B23C 5/10* (2006.01)

(52) U.S. Cl.
CPC .............. *B23C 5/109* (2013.01); *B23C 5/207* (2013.01); *B23C 2200/0416* (2013.01);
(Continued)

(58) Field of Classification Search
CPC ... B23C 5/207; B23C 5/205; B23C 2200/045; B23C 2200/0416; B23C 2200/123;
(Continued)

(56) References Cited

U.S. PATENT DOCUMENTS 4,443,136 A * 4/1984 Kemmer ............... B23B 27/083
407/110
4,588,331 A * 5/1986 Yoshinori ............. B23C 5/1045
407/113
(Continued)

FOREIGN PATENT DOCUMENTS

DE 2322825 A1 11/1973
JP S63-140315 U 9/1988
(Continued)

OTHER PUBLICATIONS

International Preliminary Report on Patentability and Written Opinion issued in PCT/JP2016/056702 dated Sep. 5, 2017.
(Continued)

*Primary Examiner* — Willmon Fridie, Jr.
(74) *Attorney, Agent, or Firm* — Studebaker & Brackett PC (57) ABSTRACT

A cutting insert including a first end surface, a second end surface and a peripheral side surface extending therebetween. The first and second end surfaces each having one substantially quadrangular portion and two substantially semicircular portions which are respectively joined to two opposing sides of the substantially quadrangular portion. An intersecting edge between each of the first and second end surfaces and the peripheral side surface is provided with a cutting edge. The cutting edge is formed in at least part of the substantially semicircular portion. At least part of a portion of the peripheral side surface which is adjacent to the substantially quadrangular portion of each of the first and second end surfaces, and at least part of a portion of the
(Continued)

peripheral side surface which is adjacent to the substantially semicircular portion, each have a function of coming into contact with an insert seat.

11 Claims, 8 Drawing Sheets

(52) U.S. Cl.
CPC .. *B23C 2200/083* (2013.01); *B23C 2200/123* (2013.01); *B23C 2200/162* (2013.01); *B23C 2200/168* (2013.01); *B23C 2200/203* (2013.01)

(58) Field of Classification Search
CPC ........ B23C 2200/0438; B23C 2200/12; B23C 2200/20; B23C 2200/203; B23C 2210/08
See application file for complete search history.

(56) References Cited

U.S. PATENT DOCUMENTS

| | | | |
|---|---|---|---|
| 4,834,591 A | | 5/1989 | Tsujimura et al. |
| 4,898,499 A | | 2/1990 | Tsujimura et al. |
| 5,017,055 A | | 5/1991 | Tsujimura et al. |
| 5,622,460 A | * | 4/1997 | Satran .................. B23C 5/1045 407/42 |
| 5,622,461 A | * | 4/1997 | Tukala .................. B23B 51/048 407/113 |
| 5,944,456 A | | 8/1999 | Shirley et al. |
| 6,273,651 B1 | * | 8/2001 | Heinloth .................. B23C 3/06 407/116 |
| 6,374,712 B1 | | 4/2002 | Muller et al. |
| 2009/0311057 A1 | * | 12/2009 | Yoshida .................. B23C 5/109 407/113 |
| 2011/0255924 A1 | * | 10/2011 | Choi .................. B23C 5/202 407/42 |
| 2012/0009029 A1 | * | 1/2012 | Saji .................. B23C 5/109 407/67 |
| 2014/0348600 A1 | | 11/2014 | Matsubara et al. |
| 2017/0050249 A1 | * | 2/2017 | Oikawa .................. B23C 5/10 |

FOREIGN PATENT DOCUMENTS

| | | |
|---|---|---|
| JP | 2012-500732 A | 1/2012 |
| WO | 93/00192 A1 | 1/1993 |
| WO | 2009/034633 A1 | 3/2009 |
| WO | 2010/023659 A1 | 3/2010 |
| WO | 2010/114094 A1 | 10/2010 |
| WO | 2014/017133 A1 | 1/2014 |

OTHER PUBLICATIONS

International Search Report issued in PCT/JP2016/056702; dated May 17, 2016.

* cited by examiner

CUTTING TOOL AND INDEXABLE ROTARY CUTTING TOOL

TECHNICAL FIELD

The present invention relates to a cutting insert and an indexable rotary cutting tool having the cutting insert removably mounted thereon.

BACKGROUND ART

A conventional cutting insert having a substantially circular shape in a plan view is known. An example of such cutting insert is disclosed in Patent Document 1. The cutting insert of Patent Document 1 is a so-called positive type cutting insert comprised of a substantially circular upper surface, a lower surface (bottom surface) arranged so as to be opposed to the upper surface, and a peripheral side surface (side surface) connecting the upper surface and the lower surface. An intersecting edge between the upper surface and the side surface is provided with a circular-arc-shaped cutting edge throughout the intersecting edge. Further, the peripheral side surface is provided with a plurality of recessed parts at certain distances in a circumferential direction of the cutting insert. An engagement part (positioning part) formed by such recessed parts is engaged with an insert seat (support seat), whereby the cutting insert is firmly fixed to the insert seat. This also provides the effect of facilitating the indexing of a cutting edge portion involved in cutting.

A rotary cutting tool having a plurality of such substantially circular cutting inserts mounted thereon is suited for various kinds of machining for forming three-dimensional shapes. Further, the cutting insert is rotated so that cutting edge portions which are to be involved in cutting may be sequentially replaced with one another so as to be used, which is economical.

CITATION LIST

Patent Documents

Patent Document 1: WO2014/17133

SUMMARY

Technical Problem

However, the substantially circular cutting insert disclosed in Patent Document 1 has the following disadvantages. Firstly, in the substantially circular cutting insert, the strength of the entire cutting insert is weak since any portion of the circular-arc-shaped cutting edge is closer to, at a certain distance, a mounting hole, being formed in substantially the center of the upper surface, for the mounting of the cutting insert. This is because large cutting resistance is applied to the cutting edge, so that a short distance between such cutting edge and the mounting hole may result in insufficient strength against load. On the contrary, in a quadrangular cutting insert, most portions of a cutting edge are distant from a mounting hole compared with the substantially circular cutting insert, and thus, the strength of the entire cutting insert can be said to be high. Meanwhile, when the mounting hole is decreased in size in order to solve the above problem, a fastening screw for fixing the cutting insert has to be decreased in size accordingly. Thus, the strength of the fastening screw is lowered, whereby the fixing force of the cutting insert may be lowered.

Secondly, when the peripheral side surface is provided with the recessed parts for the purpose of simplifying indexing, the cutting insert will be partially reduced in terms of thickness. Thus, the strength of the entire cutting insert may be lowered. Further, when such recessed parts are provided directly below the cutting edge, the strength of the cutting edge may be lowered, thereby being liable to cause the occurrence of a problem of, for example, damage to the cutting edge.

The present invention has been made in light of the above problem, and an object of the present invention is to provide a cutting insert which involves the advantages of a substantially circular cutting insert and which is also capable of overcoming the above-described disadvantages.

Solution to Problem

The present invention provides a cutting insert 1 comprising a first end surface 2, a second end surface 3 arranged so as to be opposed to the first end surface 2, and a peripheral side surface 4 extending between the first and second end surfaces 2, 3, wherein: the first end surface 2 and the second end surface 3 each have, in a plan view, a shape comprised of one substantially quadrangular portion 8 and two substantially semicircular portions 9 which are respectively joined to two opposing sides of the substantially quadrangular portion 8; an intersecting edge between each of the first end surface 2 and the second end surface 3 and the peripheral side surface 4 is provided with a cutting edge 5; the cutting edge 5 is formed in at least part of the substantially semicircular portion 9; a mounting hole 7 is formed so as to penetrate substantially respective centers of the first end surface 2 and the second end surface 3; and at least part of a portion of the peripheral side surface 4 which is adjacent to the substantially quadrangular portion 8 of each of the first end surface 2 and the second end surface 3, and at least part of a portion of the peripheral side surface 4 which is adjacent to the substantially semicircular portion 9, each have a function of coming into contact with an insert seat.

The present invention further provides an indexable rotary cutting tool 20 having a rotational axis G and comprising a tool body 21 provided with a plurality of insert seats 22, in which a cutting insert is removably mounted on the insert seat 22, wherein: the cutting insert is the above-described cutting insert 1; the insert seat 22 has at least a first wall surface 24a facing toward a leading end 26 of the tool body 21 and a second wall surface 24b facing toward an outer periphery of the tool body 21; the first wall surface 24a comes into contact with at least part of a portion of the peripheral side surface 4 which is adjacent to the substantially semicircular portion 9 of the cutting insert 1; and the second wall surface 24b comes into contact with at least part of a portion of the peripheral side surface 4 which is adjacent to the substantially quadrangular portion 8 of the cutting insert 1.

Advantageous Effects of Invention

According to the present invention, the strength of the cutting insert can be increased despite such cutting insert having cutting edges which each have substantially the same shape as that of a conventional substantially circular cutting insert and which are substantially equal in number to those thereof.

DESCRIPTION OF EMBODIMENTS

Embodiments of the present invention will hereinafter be described in detail with reference to the attached drawings.

Embodiments of the present invention will be described below with reference to the attached drawings as required. A cutting insert 1 according to the present embodiment is shown in FIGS. 1 to 5. The back view and left side view of the cutting insert 1 are the same as the front view and right side view thereof and are therefore omitted here.

The cutting insert 1 comprises a first end surface 2 and a second end surface 3 which are substantially opposed to each other, i.e., which are located on substantially opposite sides from each other, and a peripheral side surface 4 which extends therebetween. The first end surface 2 and the second end surface 3 each have a substantially rounded quadrangular shape in a plan view. Such substantially rounded quadrangular shape is a shape which is constituted by a substantially quadrangular portion 8 indicated by the broken line in FIG. 2 and two substantially semicircular portions 9 which are respectively joined to two opposing sides of the substantially quadrangular portion 8. That is, the substantially rounded quadrangular shape is a shape in which the two substantially semicircular portions 9 which do not share their centers are connected with two substantially linear portions 10. Each substantially semicircular portion 9 is smoothly tangential to the substantially linear portions 10. Herein, a reference axis A is defined which penetrates substantially respective centers of the first end surface 2 and the second end surface 3 and which extends perpendicularly to such end surfaces. Further, in a plan view, a direction extending from the reference axis A to the center of a virtual circle which has, as its arc, the curved line along the substantially semicircular portion 9 (hereinafter referred to as the "center of the semicircular arc") is defined as a longer-side direction of a rounded quadrangle. To put it another way, a longer-side direction of a rounded quadrangle is defined in a plan view as a direction extending from the center of one semicircular arc to the center of the other semicircular arc.

In the present embodiment, the portions which connect the two substantially semicircular portions 9 are the substantially linear portions 10. However, the shape is not limited thereto. In a top view, the shape may be projected outward from the cutting insert or may be recessed inward of the cutting insert.

The cutting insert 1 is formed so as to have a shape of 180-degree rotational symmetry, i.e., a shape of 2-fold rotational symmetry, about the reference axis A. In other words, in a plan view, centers of the respective circular arcs of the two substantially semicircular portions 9 are apart in opposite directions by the same distance from the reference axis A. Further, the curvature radii of the circular arcs of the two substantially semicircular portions 9 are equal to each other. A mounting hole 7 is formed, extending so as to penetrate the two end surfaces 2, 3, and the mounting hole 7 is arranged such that a central axis thereof matches the reference axis A of the cutting insert 1. The reference axis A extends perpendicularly to the first end surface 2. The first end surface 2 and the second end surface 3 are arranged so as to be parallel to each other. The cutting insert 1 is formed so as to have the same shape when it is rotated by 180 degrees around an axis orthogonal to the reference axis A such that the two end surfaces 2, 3 are reversed. Further, the peripheral side surface 4 intersects substantially perpendicularly with the two end surfaces 2, 3. Accordingly, the cutting insert 1 of the present embodiment is of a so-called negative type with a clearance angle of 0 degrees.

For ease of description, one end surface 2 of the two end surfaces 2, 3 is hereinafter referred to as an "upper surface" (corresponding to the first end surface of the present invention), and the other end surface 3 of the two end surfaces is hereinafter referred to as a "lower surface" (corresponding to the second end surface of the present invention). Further, the direction from the lower surface 3 to the upper surface 2 along the direction of the reference axis A is referred to as an "upward direction," while the direction from the upper surface 2 to the lower surface 3 along the direction of the reference axis A is referred to as a "downward direction." It should be noted, however, that the words "upper/upward" and "lower/downward" do not limit the present invention and that the present invention should not be interpreted narrowly based on such words.

In the cutting insert 1 of the present embodiment, an intersecting edge between each of the upper surface 2 and the lower surface 3 and the peripheral side surface 4 is provided with cutting edges 5 along such intersecting edge. In other words, the cutting insert 1 of the present embodiment is of a double-side use type in which both the upper and lower surfaces 2, 3 can be used for cutting. When the cutting edges 5 of the upper surface 2 are used for cutting, the upper surface 2 serves as a rake surface, the lower surface 3 serves as a seating surface, and the peripheral side surface 4 serves as a flank or contact surface. Meanwhile, when the cutting edges 5 of the lower surface 3 are used for cutting, the lower surface 3 serves as a rake surface, the upper surface 2 serves as a seating surface, and the peripheral side surface 4 serves as a flank or contact surface. The seating surface and the contact surface each refer to a surface having a portion which comes into contact with the insert seat 22 of the tool body 21. Hereinafter, a portion on each of the upper surface 2 and the lower surface 3 which comes into contact with the insert seat 22 is referred to as a seating part 6. The seating part 6 may be configured such that the entirety or part thereof comes into surface contact with the insert seat 22, may be configured such that a point or multiple points thereof come(s) into point contact with the insert seat 22, or may be configured so as to come into line contact with the insert seat 22 over a certain range.

The cutting insert 1 of the present embodiment will be described below in terms of the upper surface 2 only. Each cutting edge 5 is, in general, constituted by two portions 5a, 5b. As described above, a contour shape of the upper surface 2 includes the substantially semicircular portions 9 and the substantially linear portions 10. As to each cutting edge 5, in a plan view, a portion of the cutting edge 5 which corresponds to the substantially semicircular portion 9 is referred to as the circular-arc-shaped cutting edge 5a, and a portion of the cutting edge 5 which corresponds to the substantially linear portion 10 is referred to as the linear cutting edge 5b. In a plan view, the circular-arc-shaped cutting edge 5a is formed such that the length therealong is longer than the length of the linear cutting edge 5b. In other words, the cutting edge 5 is configured such that it is mainly the circular-arc-shaped cutting edge 5a that functions. In the cutting insert 1 of the present embodiment, a curvature radius R of the arc of the circular-arc-shaped cutting edge 5a is approximately 4 mm in a plan view. That is, the length of the circular-arc-shaped cutting edge 5a therealong is approximately 12 mm. The length of the linear cutting edge 5b is approximately 5 mm in a plan view. However, the lengths of the above cutting edges are not limited thereto. Each dimension of the cutting edge 5 is adjusted as appropriate, in accordance with, for example, the shape of a workpiece. Further, the cutting edges 5 may be formed throughout the intersecting edge between the upper surface 2 and the peripheral side surface 4 or may be formed through only part of such intersecting edge.

Figure 1:
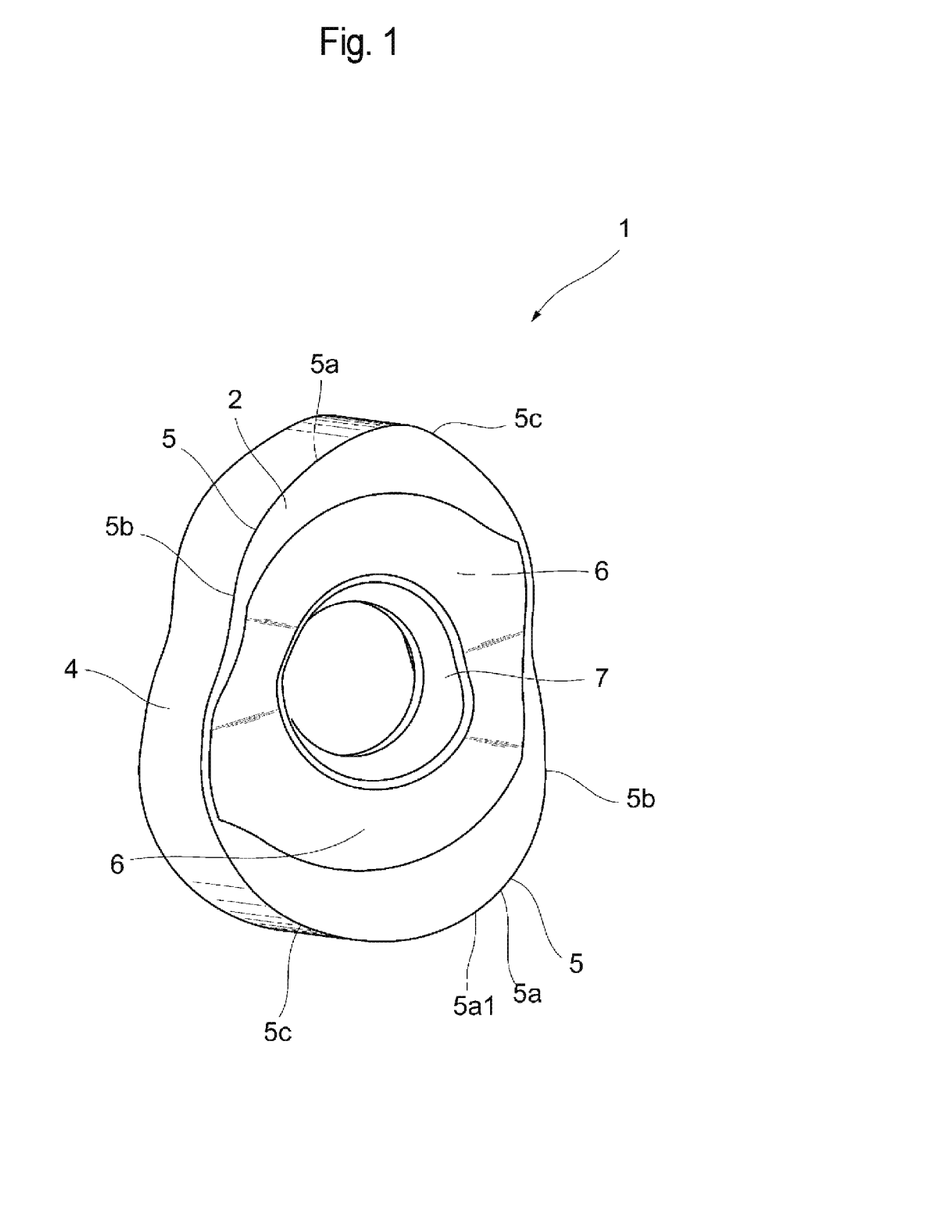
FIG. 1 is a perspective view of an embodiment of a cutting insert according to the present invention.
Figure 2:
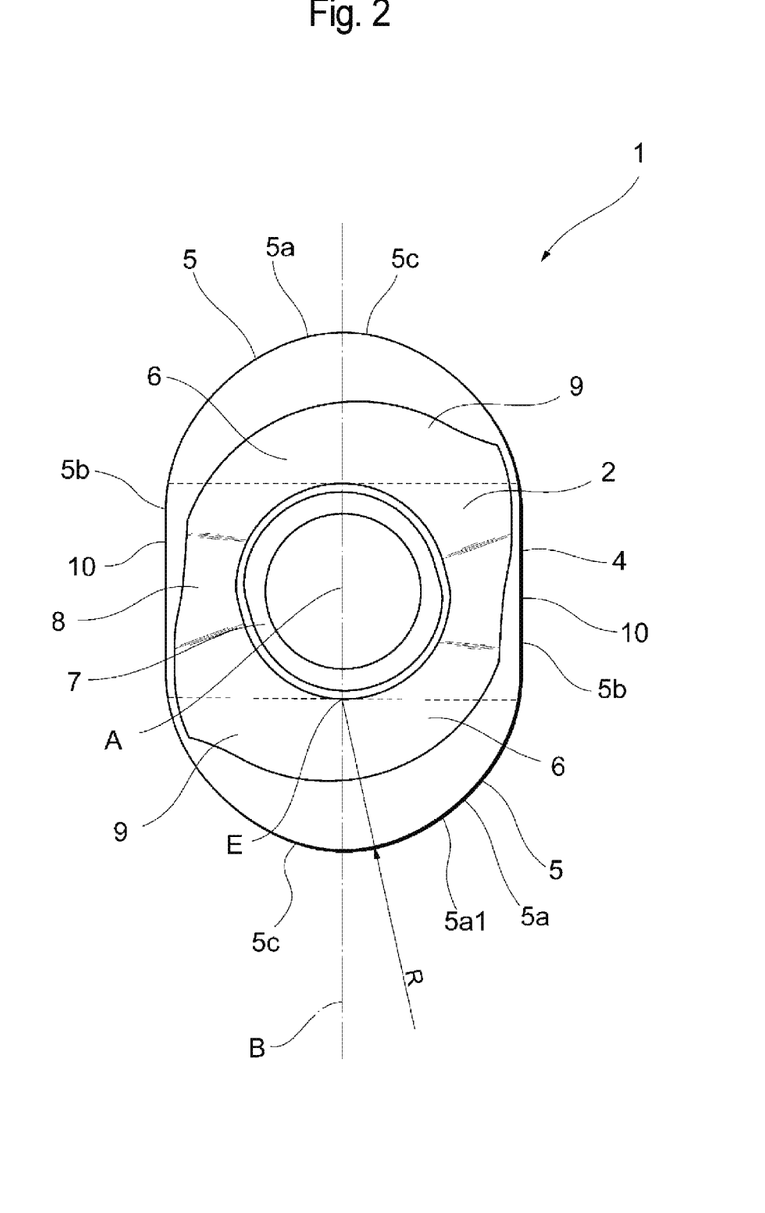
FIG. 2 is a plan view of an embodiment of a cutting insert according to the present invention.
Figure 3:
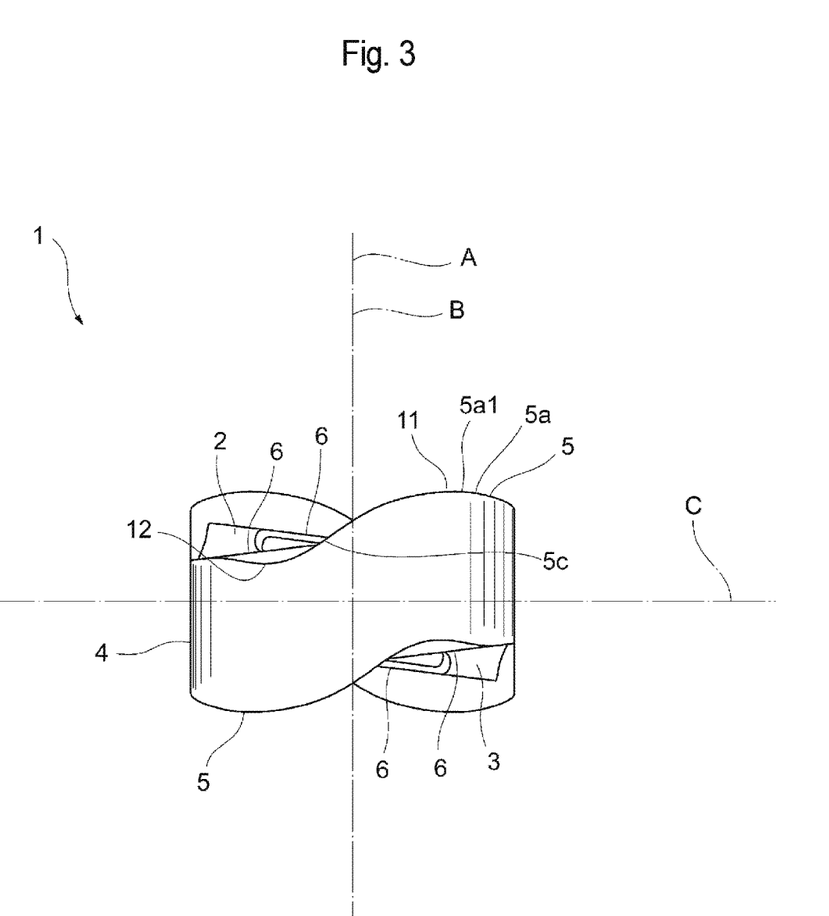
FIG. 3 is a front view of an embodiment of a cutting insert according to the present invention.
Figure 4:
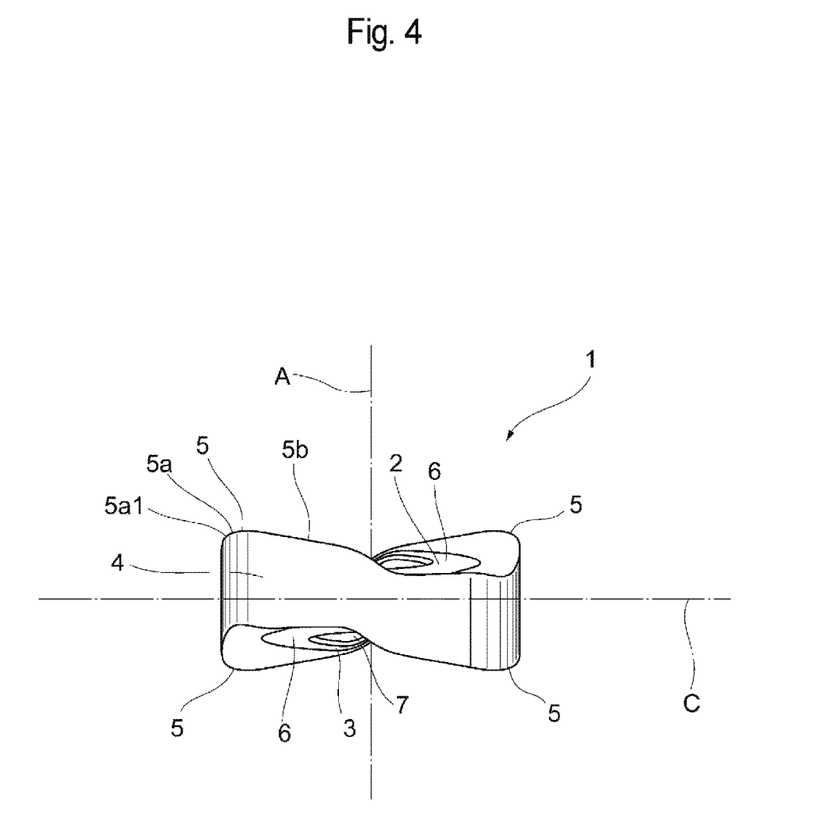
FIG. 4 is a right side view of an embodiment of a cutting insert according to the present invention.
Figure 5:
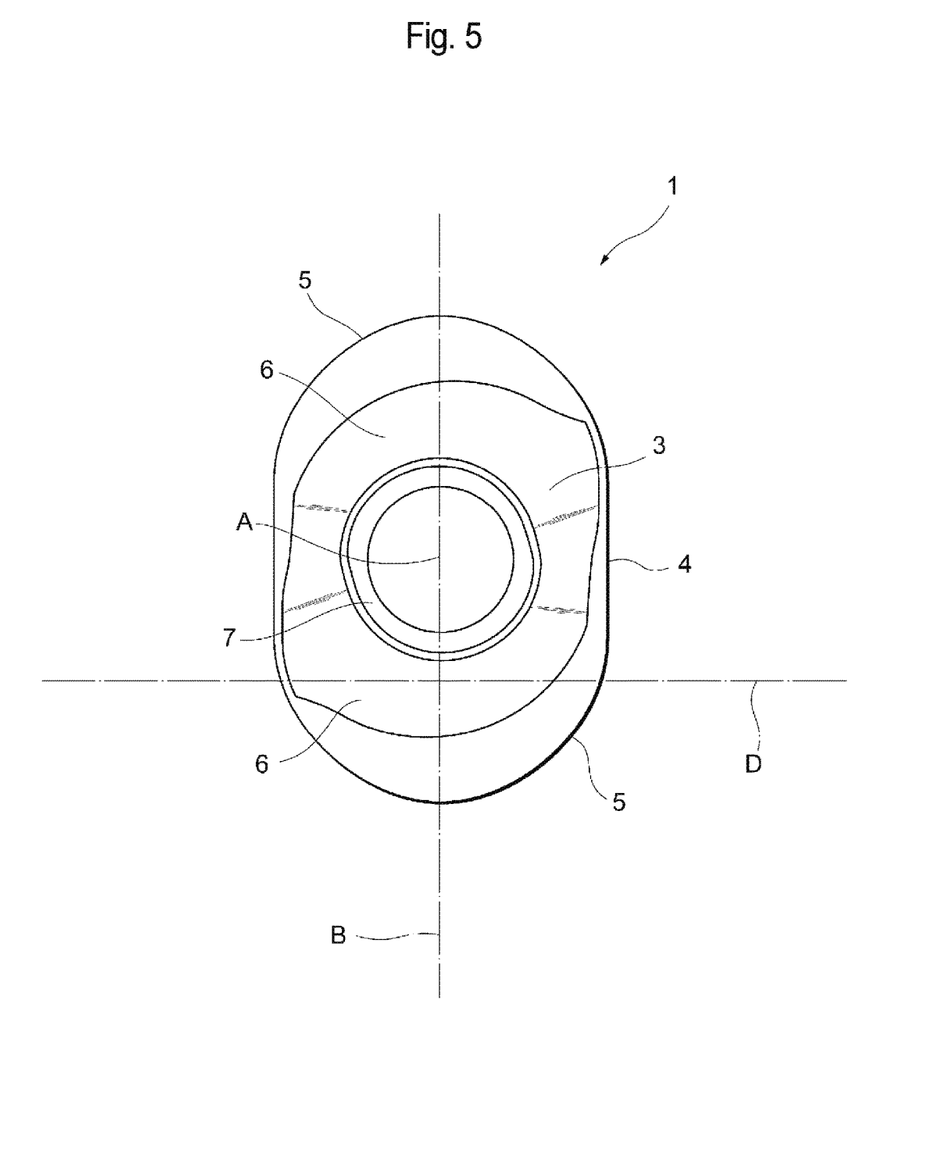
FIG. 5 is a bottom view of an embodiment of a cutting insert according to the present invention.

Attention is now directed to a plan view (FIG. 2) of the cutting insert 1. When the substantially semicircular portions 9 are each approximated into a single circular arc and when the center of a virtual circle having such circular arc is defined as a point E, a virtual plane which passes through the point E and includes the reference axis A can be defined as a first reference plane B, as described above. Here, one of the circular-arc-shaped cutting edges 5a corresponding to the substantially semicircular portions, regarding each of which the point E serving as the center has been determined, will be specifically referred to as a first circular-arc-shaped cutting edge 5a1. Next, a virtual plane which extends perpendicularly to the reference axis A and which is arranged so as to be closer to the upper surface 2 than the lower surface 3 can be defined as a second reference plane C. As shown in FIGS. 3 and 4, the second reference plane C is herein defined in the middle of the upper surface 2 and the lower surface 3, i.e., at a position that divides the cutting insert 1 into two substantially equal parts. In the cutting insert 1 of the present embodiment, the second reference plane C passes through the peripheral side surface 4, but does not intersect with either the upper surface 2 or the lower surface 3. In addition, a virtual plane which is orthogonal to both the first reference plane B and the second reference plane C and which extends so as to intersect with the first circular-arc-shaped cutting edge 5a1 and to traverse the seating part 6 can be defined as a virtual plane D.

In a side view (a view seen from the front) in FIG. 3 in which the cutting edge 5, including the first circular-arc-shaped cutting edge 5a1, is viewed from a direction facing the virtual plane D, the first circular-arc-shaped cutting edge 5a1 is formed so as to be generally inclined relative to the second reference plane C. In other words, the first circular-arc-shaped cutting edge 5a1 has an apex 11 on the upper right side in FIG. 3, the apex being a point at which the first circular-arc-shaped cutting edge 5a1 is the furthest apart from the second reference plane C. The apex 11 may be a single point or may be an area having a certain width. The first circular-arc-shaped cutting edge 5a1 gradually approaches the second reference plane C, heading from the apex 11 to the first reference plane B. At the same time, the first circular-arc-shaped cutting edge 5a1 gradually approaches the second reference plane C, heading from the apex 11 to the linear cutting edge 5b. Further, in a direction extending from the apex 11 to the first reference plane B, the first circular-arc-shaped cutting edge 5a1 reaches a lowest part 12, being the closest to the second reference plane C, then gradually becomes distant from the second reference plane C and is connected to the other substantially linear portion 10. Therefore, the first circular-arc-shaped cutting edge 5a1 has, as its entire shape, a substantially curved S-shape in a side view. Herein, the lowest part 12 may be a single point or may be an area having a certain width.

As shown in FIG. 3, in the present embodiment, a cutting edge portion of the first circular-arc-shaped cutting edge 5a1 which is around the lowest part 12 is located below the seating part 6. In other words, the cutting edge 5 includes a cutting edge portion which is located closer to the second reference plane C than the seating part 6.

In the first circular-arc-shaped cutting edge 5a1, a cutting edge portion which is located on the left to the first reference plane B in FIG. 3 is a so-called inner cutting edge 5c. The inner cutting edge 5c is a cutting edge which is involved in cutting during machining, like ramping, in which the tool is fed obliquely upward or downward. Therefore, the inner cutting edge 5c can also be referred to as a ramping cutting edge. In the present embodiment, the inner cutting edge 5c includes the lowest part 12 which is located below the seating part 6.

In FIG. 4, which is a right side view, the first circular-arc-shaped cutting edge 5a1 is inclined so as to approach the second reference plane C, heading to the linear cutting edge 5b. In other words, the first circular-arc-shaped cutting edge 5a1 is formed so as to be inclined relative to the second reference plane C. Since the second reference plane C is parallel to the lower surface 3, the first circular-arc-shaped cutting edge 5a1 is inclined so as to approach the lower surface 3 heading from the apex 11 to the linear cutting edge 5b. In the cutting insert 1 of the present embodiment, the linear cutting edge 5b is also formed so as to be inclined relative to the second reference plane C. To be more specific, the linear cutting edge 5b is inclined so as to approach the second reference plane C, heading away from the first circular-arc-shaped cutting edge 5a1. Further, in FIG. 4, one cutting edge 5 is inclined so that its circular-arc-shaped cutting edge 5a and linear cutting edge 5b are continuously inclined in the same direction, and so that it extends toward the adjacent cutting edge 5.

The cutting insert 1 of the present embodiment is provided with two sets of cutting edges, i.e., the two cutting edges 5, on the upper surface 2 side. Therefore, when regarding one circular-arc-shaped cutting edge 5a, one linear cutting edge 5b and one inner cutting edge 5c as constituting one cutting edge section, the upper and lower surfaces are each provided with two such cutting edge sections. In the cutting insert 1 of the present embodiment, the intersecting edge between the lower surface 3 and the peripheral side surface 4 is also provided with the cutting edges 5, as with the case of the upper surface 2. Each of the cutting edges 5 is formed so that the same shape is generated when the cutting insert 1 is rotated by 180 degrees around the axis orthogonal to the reference axis A such that the upper surface 2 and the lower surface 3 are reversed. In other words, a total of four sets of cutting edges 5 are formed. Accordingly, the cutting insert 1 is an economical cutting insert since it can be used at least four times—twice by using the upper surface 2 side and twice by reversing the cutting insert 1 and using the lower surface 3 side. The below description will be made only for the case where one cutting edge 5 on the upper surface 2 side is used. Since the other three cutting edges 5 are used in a similar manner, the description thereof will be omitted here. The circular-arc-shaped cutting edge 5a of the active cutting edge which is used in the below description is assumed to be the above-described first circular-arc-shaped cutting edge 5a1. In the foregoing description, the first circular-arc-shaped cutting edge 5a1, which is one of the circular-arc-shaped cutting edges 5a, has been described regarding its shape, and since the same applies to the remaining three circular-arc-shaped cutting edges 5a, the description thereof will be omitted here. It should be noted that the shapes of the cutting edges of the cutting insert according to the present invention are not limited to the above-described shapes of the cutting insert 1. Whether or not the cutting edges 5 have inclination, as well as the angles of inclination, etc., may be adjusted as appropriate, according to the workpiece and the cutting conditions. Further, it may be possible to employ a configuration in which the linear cutting edges 5b or the inner cutting edges 5c are not formed.

The cutting insert 1 can be made of hard materials, such as cemented carbide, cermet, ceramic, or an ultrahigh-pressure sintered body containing diamond or cubic boron nitride, or a material obtained by applying a PVD or CVD coating to the surface of these hard materials.

Figure 6:
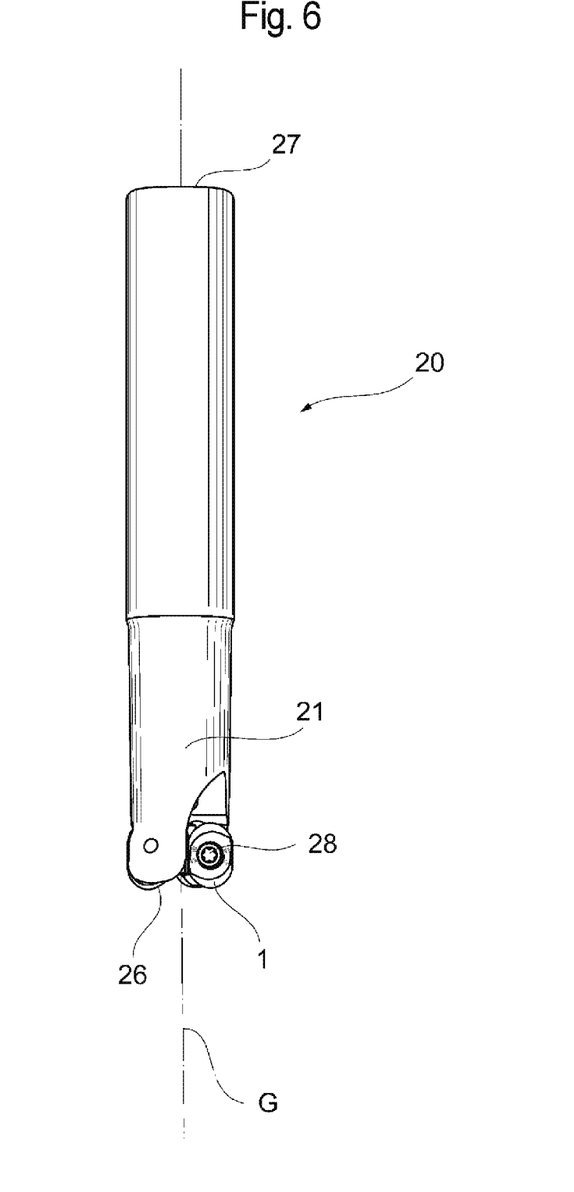
FIG. 6 is a perspective view of an embodiment of an indexable rotary cutting tool according to the present invention.

The cutting insert 1 having the above-described configuration is removably mounted on the insert seat 22 in the tool body 21 of the cutting tool 20 of the present embodiment by means of a clamping member 28 which is a mechanical mounting means. The indexable rotary cutting tool 20 on which the cutting insert 1 is mounted will be further described below with reference to FIGS. 6 to 8. The cutting tool 20 of the present embodiment uses a fastening screw 28 as the clamping member 28.

The cutting tool 20 comprises the tool body 21 provided with a plurality of insert seats 22 (two insert seats in this example). One cutting insert 1 can be removably mounted on each insert seat 22.

The tool body 21 is configured so as to rotate around the rotational axis G of the tool, which is defined so as to pass through the tool body 21 from the leading end 26 to a base end 27. In other words, the tool body 21 is generally formed in a substantially cylindrical shape. The two insert seats 22 are provided around the leading end 26 of the tool body 21 at equal distances. Each of a plurality of cutting inserts 1 used for this cutting tool 20 has the same configuration and the same shape. Thus, each of the plurality of insert seats 22 provided in the tool body 21 also has the same shape. The cutting tool 20 of the present embodiment is a rotary cutting tool. More specifically, the cutting tool 20 of the present embodiment is a radius end mill using the above-described cutting insert 1.

Figure 7:
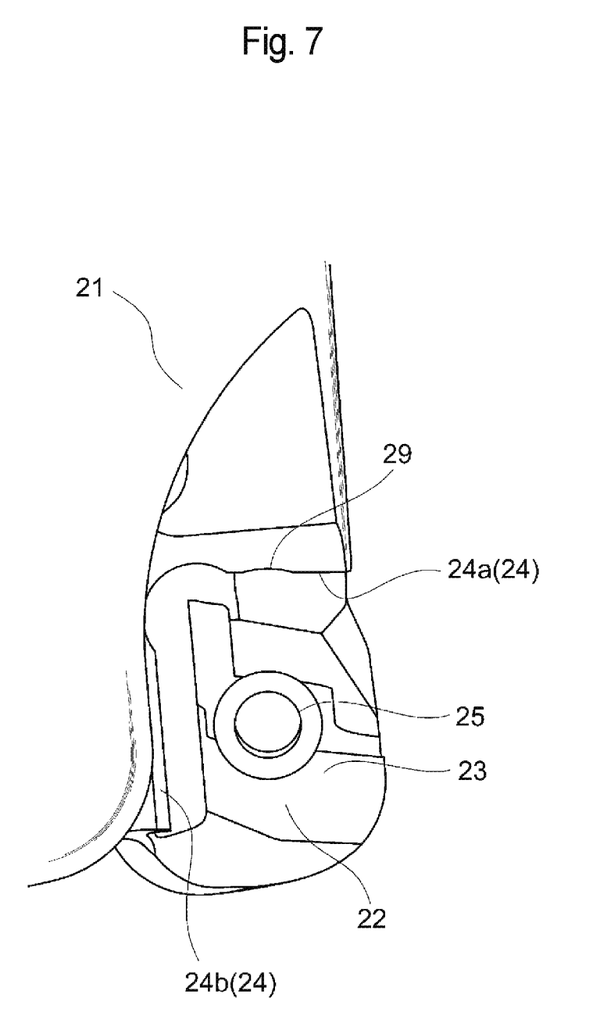
FIG. 7 is an enlarged view of an insert seat and a peripheral part thereof in the tool body shown in FIG. 6.

The cutting insert 1 is mounted on each insert seat 22 in the tool body 21 so that the upper surface 2 or the lower surface 3 faces forward in the direction of tool rotation around the tool rotational axis G. As shown in FIG. 7, each insert seat 22 has a bottom surface 23 and a wall surface 24 and is open toward the leading end 26 and the outer periphery of the tool body 21. Here, a surface with which the upper surface 2 or the lower surface 3 of the cutting insert 1 can be brought into contact is called the bottom surface 23 of the insert seat 22, while a surface with which the peripheral side surface 4 of the cutting insert 1 can be brought into contact is called the wall surface 24. Therefore, the bottom surface 23 faces forward in the direction of tool rotation around the tool rotational axis G. The bottom surface 23 has a shape corresponding to the upper surface 2 and the lower surface 3 of the cutting insert 1. Meanwhile, the wall surface 24 is constituted by a first wall surface 24a facing toward the leading end 26 of the tool body 21 and a second wall surface 24b facing toward the outer periphery of the tool body 21. In the present embodiment, the first wall surface 24a is comprised of a flat surface on which a recessed and curved part 29 is formed. The second wall surface 24b is entirely configured by a flat surface. Further, the bottom surface 23 of the insert seat 22 is provided with a threaded hole 25.

Figure 8:
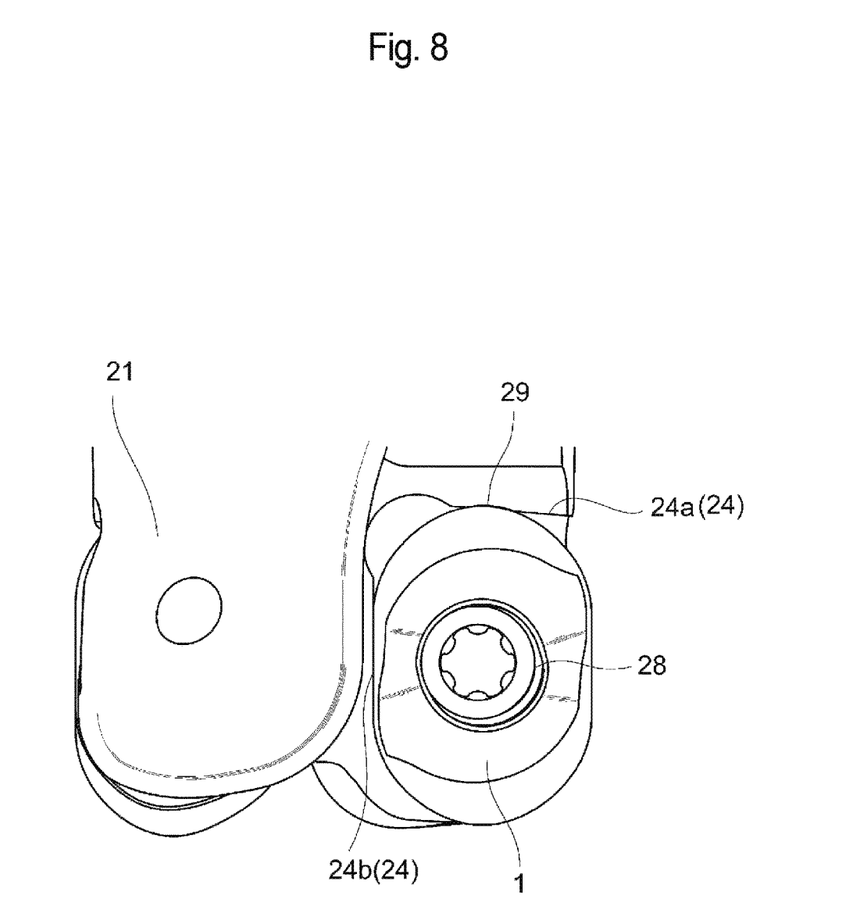
FIG. 8 is an enlarged view of an insert seat and a peripheral part thereof in the cutting tool shown in FIG. 6.

A cutting insert 1 is arranged on the insert seat 22 and fixed with the fastening screw 28 so that one of the cutting edges 5 in the cutting insert 1 is made available. In FIG. 8, the cutting insert 1 is mounted on the insert seat 22 so that the cutting edge 5 including the first circular-arc-shaped cutting edge 5a1 will serve as an active cutting edge. At this time, the lower surface 3 of the cutting insert 1 comes into contact with the bottom surface 23 of the insert seat 22. Further, a portion of the peripheral side surface 4, being adjacent to the substantially semicircular portion 9 located on the opposite side to the side where the first circular-arc-shaped cutting edge 5a1 of the cutting insert 1 is formed, comes into contact with the recessed and curved part 29 on the first side wall 24a of the insert seat 22. Further, a portion of the peripheral side surface 4 which is adjacent to one of the substantially linear portions 10 of the cutting insert 1 comes into contact with the second side wall 24b of the insert seat 22. The same applies to the case where the cutting insert 1 is mounted on the insert seat so that each of the remaining three sets of cutting edges 5 will serve as an active cutting edge, and thus, the description thereof will be omitted here. Moreover, the insert seat 22 is not limited to having the above-described shape and may be changed as appropriate.

The operation and effects of the cutting insert 1 described above and the indexable rotary cutting tool 20 on which such cutting insert 1 is mounted will be described below.

As described above, the present embodiment involves configurations in which: the first end surface 2 and the second end surface 3 each have, in a plan view, the substantially rounded quadrangular shape, which is constituted by the substantially quadrangular portion 8 and the two substantially semicircular portions 9 which are respectively joined to the two opposing sides of the substantially quadrangular portion 8; the intersecting edge between each of the upper surface 2 and the lower surface 3 and the peripheral side surface 4 is provided with the cutting edges 5; each cutting edge 5 is formed in at least part of the substantially semicircular portion 9; the mounting hole 7 is formed so as to penetrate the respective centers of the first end surface 2 and the second end surface 3; and at least part of the portion of the peripheral side surface 4 which is adjacent to the substantially quadrangular portion 8 in each of the first end surface 2 and the second end surface 3, and at least part of a portion of the peripheral side surface 4 which is adjacent to the substantially semicircular portion 9, function as contact surfaces which come into contact with the insert seat. With such configurations, the following effects can be obtained. Although the cutting insert 1 of the present embodiment has each circular-arc-shaped cutting edge 5a which is similar to that of a conventional substantially circular cutting insert, such cutting insert 1 allows a greater distance between the mounting hole 7 and the cutting edge 5 to be secured than in the case of such conventional substantially circular cutting insert. In other words, when the size of the virtual circle including, as its arc, the substantially semicircular portion 9, is the same as that of the conventional substantially circular cutting insert, the distance between the reference axis A of the cutting insert 1 and the circular-arc-shaped cutting edge 5a in the present embodiment is much longer than that of the conventional substantially circular cutting insert. Thus, the strength of the entire cutting insert 1 (in particular, the strength of the cutting edge 5) is high, and fracturing due to cutting resistance, etc., can be greatly reduced. Further, even if the fastening screw 28 is increased in size (i.e., even if the mounting hole 7 is increased in size) with the aim of enhancing the fixing force of the cutting insert 1, a long distance can be provided between the mounting hole 7 and the circular-arc-shaped cutting edge 5a compared with the prior art, and thus, the strength of the cutting edge is not impaired. Moreover, in the cutting insert 1 of the present embodiment, the indexing of a cutting edge can be performed with respect to part of a portion of the peripheral side surface 4 which is adjacent to the substantially quadrangular portion 8 and part of a portion of the peripheral side surface 4 which is adjacent to the substantially semicircular portion 9. In other words, part of a portion of the peripheral side surface 4 which is adjacent to the substantially quadrangular portion 8 and part of a portion of the peripheral side surface 4 which is adjacent to the substantially semicircular portion 9 are brought into contact with a side surface of the insert seat so that such parts will serve as reference surfaces, whereby the cutting edge for use can be changed and fixed, and therefore, it is unnecessary to provide the peripheral side surface with recessed parts, as opposed to the prior art. Thus, indexing can be performed with no reduction in the strength of the entire cutting insert 1. Furthermore, the cutting insert 1 of the present embodiment is a double-side use cutting insert in which both the first end surface 2 and the second end surface 3 are provided with cutting edges, and thus, such cutting insert 1 can have cutting edges which are substantially equal in number to those of the conventional substantially circular cutting insert.

As described above, the cutting insert 1 of the present embodiment provides the remarkable effect of having high strength despite such cutting insert 1 having cutting edges which each have substantially the same shape as that of the conventional substantially circular cutting insert and which are substantially equal in number to those thereof.

In the cutting insert 1 of the present embodiment, each cutting edge 5 formed on the first end surface 2 side preferably has a portion which is projected from the seating part 6 of the first end surface 2, and each cutting edge 5 formed on the second end surface 3 side preferably has a portion which is projected from the seating part 6 of the second end surface 3. Since the cutting insert 1 of the present embodiment is a double-side use cutting insert, the cutting insert 1 needs to be mounted on the tool body 21 with an axial rake angle being negative, leading to high cutting resistance applied on the cutting edges 5. Therefore, by projecting the cutting edges 5 respectively from the seating parts 6, as described above, the cutting edges 5 become sharp, thereby making it possible to reduce the cutting resistance.

The cutting edge 5 preferably comprises not only the circular-arc-shaped cutting edge 5a but also the linear cutting edge 5b. This is because the presence of the linear cutting edge 5b allows for a large amount of cutting depth, thereby making it possible to perform highly efficient machining.

The inner cutting edge 5c is preferably formed on a side, with which the linear cutting edge 5b is not connected, of the circular-arc-shaped cutting edge 5a. The presence of the inner cutting edge 5c allows for ramping to be performed, thereby making it possible to machine various shapes.

The cutting edge 5a is preferably configured so as to be gradually raised, heading from the linear cutting edge 5b to the circular-arc-shaped cutting edge 5a, and then to be gradually lowered, with the apex 11 as the highest portion. When the cutting edge 5 is inclined as described above, the impact when the cutting edge 5 bites into a workpiece is alleviated. In other words, when the cutting edge 5 bites into a workpiece, the cutting edge 5 in its entirety does not come into contact with the workpiece simultaneously, and rather, the cutting edge 5 gradually bites into the workpiece, starting from a portion of the cutting edge 5 around the apex 11. Therefore, the impact when the cutting edge 5 bites into the workpiece is reduced, thereby making it possible to reduce damage and chattering of the cutting edge 5. At this time, the apex 11 preferably exists in a portion other than the inner cutting edge 5c of the circular-arc-shaped cutting edge 5a. This is because, if the apex 11 is provided in the linear cutting edge 5b or in the inner cutting edge 5c, chips produced when the circular-arc-shaped cutting edge 5a is involved in cutting may not be discharged well toward the back of the cutting insert 1.

It is preferable that part of the cutting edge 5 is located at a lower level than the seating part 6, and it is also preferable that the inner cutting edge 5c includes a cutting edge portion located at a lower level than the seating part 6. When the inner cutting edge 5c includes such cutting edge portion located at a lower level than the seating part 6, this results in a shape in which a portion of the peripheral side surface 4 which is adjacent to the inner cutting edge 5c (i.e., a flank of the inner cutting edge 5c) is greatly relieved in the downward direction. The inner cutting edge 5c is located on the inner periphery side of the tool and thus invites poor chip discharging efficiency, leading to a major problem of trapped chips. However, as described above, the portion of the peripheral side surface 4 which is adjacent to the inner cutting edge 5c is greatly relieved, whereby chips are smoothly discharged without being trapped between the inner cutting edge 5c and the workpiece.

In the cutting insert 1 of the present embodiment, the peripheral side surface 4 is given a clearance angle of 0 degrees throughout the periphery thereof (i.e., the cutting insert 1 is of a so-called negative type), but the configuration is not limited thereto. A portion of the peripheral side surface 4 which is adjacent to the cutting edge 5 may be given a positive clearance angle or a negative clearance angle, or a combination of such clearance angles may be employed. For example, a portion of the peripheral side surface 4 which is adjacent to the circular-arc-shaped cutting edge 5a may involve variations of a clearance angle varying from positive to negative as the distance from the circular-arc-shaped cutting edge 5a increases, heading from one of the ends of the circular-arc-shaped cutting edge 5a to the other end thereof. In other words, for example, when it is desired that a large clearance angle be secured or that the strength of the cutting edge be increased, the clearance angle may be made to vary as appropriate, according to the circumstances.

The indexable rotary cutting tool 20 of the present embodiment is preferably configured such that the first wall surface 24a of the insert seat 22 has a recessed and curved part 29 and such that at least part of a portion of the peripheral side surface 4 which is adjacent to the substantially semicircular portion 9 of the cutting insert 1 comes into contact with the recessed and curved part 29. Since the curved surface portion, functioning as a contact surface of the peripheral side surface 4, such curved surface portion being adjacent to the substantially semicircular portion 9 of the cutting insert 1, is reliably held within the recessed and curved part 29, this makes it possible to suppress shifting of the cutting insert 1 in a radial direction of the tool.

Although representative embodiments of the present invention have been described above, various modifications may be made to the present invention, and any replacements and modifications thereof may be made without departing from the spirit and scope of the invention defined in the scope of the claims of the present application.

REFERENCE SIGNS LIST

1 Cutting insert
2 First end surface (upper surface)
3 Second end surface (lower surface)
4 Peripheral side surface
5 Cutting edge
5*a* Circular-arc-shaped cutting edge
5*a*1 First circular-arc-shaped cutting edge
5*b* Linear cutting edge
5*c* Inner cutting edge
6 Seating part
7 Mounting hole
8 Substantially quadrangular portion
9 Substantially semicircular portion
10 Substantially linear portion
11 Apex
12 Lowest part
20 Indexable rotary cutting tool
21 Tool body
22 Insert seat
23 Bottom surface of the insert seat
24 Wall surface of the insert seat
24*a* First wall surface
24*b* Second wall surface
25 Threaded hole
26 Leading end
27 Base end
28 Clamping member (fastening screw)
29 Recessed and curved part

What is claimed is:

1. A cutting insert comprising a first end surface, a second end surface arranged so as to be opposed to the first end surface, and a peripheral side surface extending between the first and second end surfaces, wherein:
    the first end surface and the second end surface each have, in a plan view, a shape comprised of one substantially quadrangular portion and two substantially semicircular portions which are respectively joined to two opposing sides of the substantially quadrangular portion;
    an intersecting edge between each of the first end surface and the second end surface and the peripheral side surface is provided with a cutting edge;
    the cutting edge is formed in at least part of the substantially semicircular portion; and
    a mounting hole is formed so as to penetrate substantially respective centers of the first end surface and the second end surface,
    wherein
    the cutting edge has a linear cutting edge formed in at least part of the substantially quadrangular portion and a circular-arc-shaped cutting edge formed in at least part of the substantially semicircular portion, the circular-arc-shaped cutting edge being connected to the linear cutting edge, and
    when defining a reference axis A which penetrates substantially respective centers of the first end surface and the second end surface, and a virtual plane C which extends in a direction perpendicular to the reference axis A and which is located at substantially respective centers of the first end surface and the second end surface,
    the cutting edge, in a side view, is raised so as to be apart from the virtual plane C, heading from the linear cutting edge to the circular-arc-shaped cutting edge, and is then lowered so as to be close to the virtual plane C, with an apex as a highest portion.

2. The cutting insert according to claim 1, wherein:
    the cutting edge formed on the first end surface side has a portion having a larger distance from the virtual plane than a distance between the virtual plane and a seating part of the first end surface in a direction extending from the second end surface to the first end surface; and
    the cutting edge formed on the second end surface side has a portion having a larger distance from the virtual plane than a distance between the virtual plane and a seating part of the second end surface in a direction extending from the first end surface to the second end surface.

3. A cutting insert comprising a first end surface, a second end surface arranged so as to be opposed to the first end surface, and a peripheral side surface extending between the first and second end surfaces, wherein:
    the first end surface and the second end surface each have, in a plan view, a shape comprised of one substantially quadrangular portion and two substantially semicircular portions which are respectively joined to two opposing sides of the substantially quadrangular portion;
    an intersecting edge between each of the first end surface and the second end surface and the peripheral side surface is provided with a cutting edge;
    the cutting edge is formed in at least part of the substantially semicircular portion; and
    a mounting hole is formed so as to penetrate substantially respective centers of the first end surface and the second end surface, wherein
    the cutting edge has a linear cutting edge formed in at least part of the substantially quadrangular portion and a circular-arc-shaped cutting edge formed in at least part of the substantially semicircular portion, the circular-arc-shaped cutting edge being connected to the linear cutting edge, and
    an inner cutting edge is formed on a side, with which the linear cutting edge is not connected, of the circular-arc-shaped cutting edge.

4. The cutting insert according to claim 3, wherein, when defining a reference axis A which penetrates substantially respective centers of the first end surface and the second end surface, and a virtual plane C which extends in a direction perpendicular to the reference axis A and which is located at substantially respective centers of the first end surface and the second end surface,
    the cutting edge, in a side view, is raised so as to be apart from the virtual plane C, heading from the linear cutting edge to the circular-arc-shaped cutting edge, and is then lowered so as to be close to the virtual plane C, with an apex as a highest portion.

5. The cutting insert according to claim 4, wherein the apex exists in a portion other than the inner cutting edge of the circular-arc-shaped cutting edge.

6. The cutting insert according to claim 5, wherein:
part of the cutting edge is located closer to the virtual plane C than the seating part; and
the inner cutting edge includes the cutting edge portion located closer to the virtual plane C than the seating part.

7. The cutting insert according to claim 1, wherein:
the cutting edge is formed so as to be of 180-degree rotational symmetry to the reference axis A in a plan view; and
the first end surface and the second end surface have a same shape.

8. The cutting insert according to claim 1, wherein the peripheral side surface is given a clearance angle of 0 degrees throughout the cutting insert.

9. The cutting insert according to claim 1, wherein a portion of the peripheral side surface which is adjacent to the cutting edge is given a positive clearance angle or a negative clearance angle, or has a shape being a combination of a surface creating a positive clearance angle and another surface creating a negative clearance angle.

10. An indexable rotary cutting tool having a rotational axis G and comprising a tool body provided with a plurality of insert seats, in which a cutting insert is removably mounted on the insert seat, wherein:
the cutting insert is the cutting insert according to claim 1;
the insert seat has at least a first wall surface facing toward a leading end of the tool body and a second wall surface facing toward an outer periphery of the tool body;
the first wall surface comes into contact with at least part of a portion of the peripheral side surface which is adjacent to the substantially semicircular portion of the cutting insert; and
the second wall surface comes into contact with at least part of a portion of the peripheral side surface which is adjacent to the substantially quadrangular portion of the cutting insert.

11. The indexable rotary cutting tool according to claim 10, wherein:
the first wall surface has a recessed and curved part; and
at least part of a portion of the peripheral side surface which is adjacent to the substantially semicircular portion of the cutting insert comes into contact with the recessed and curved part.

* * * * *